July 26, 1949.　　　　O. A. NEBEL　　　2,476,996
CASING FOR SPOOLS OF PHOTOGRAHIC FILM AND
ASSEMBLED FILM CARTRIDGES
Filed Dec. 21, 1946　　　　　　　2 Sheets-Sheet 1
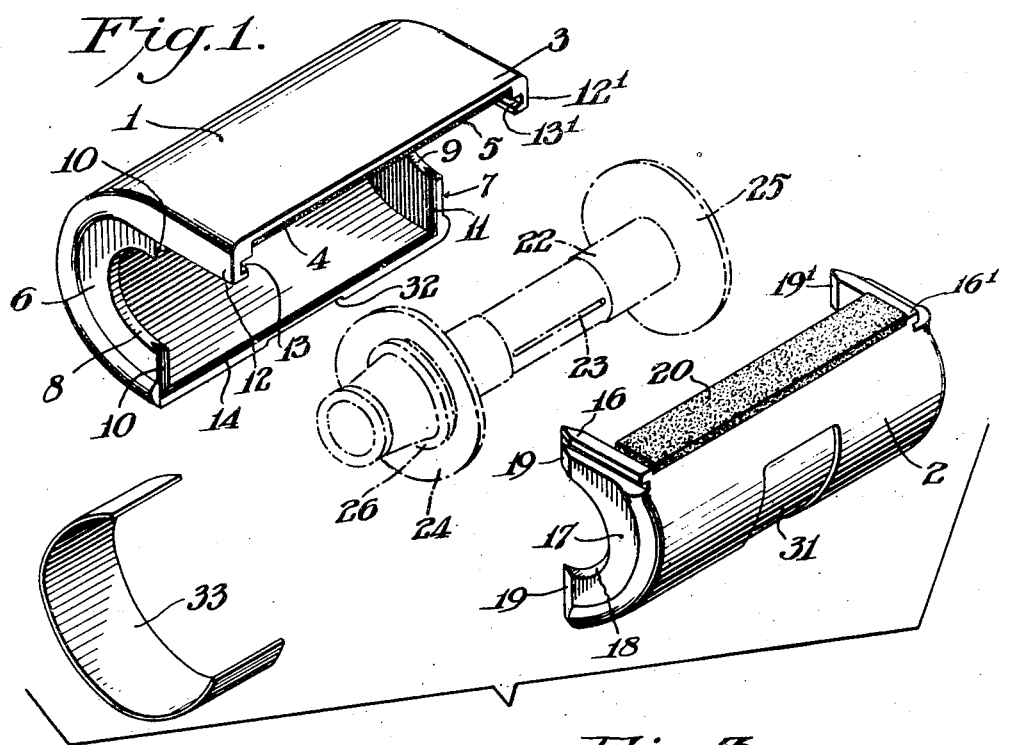
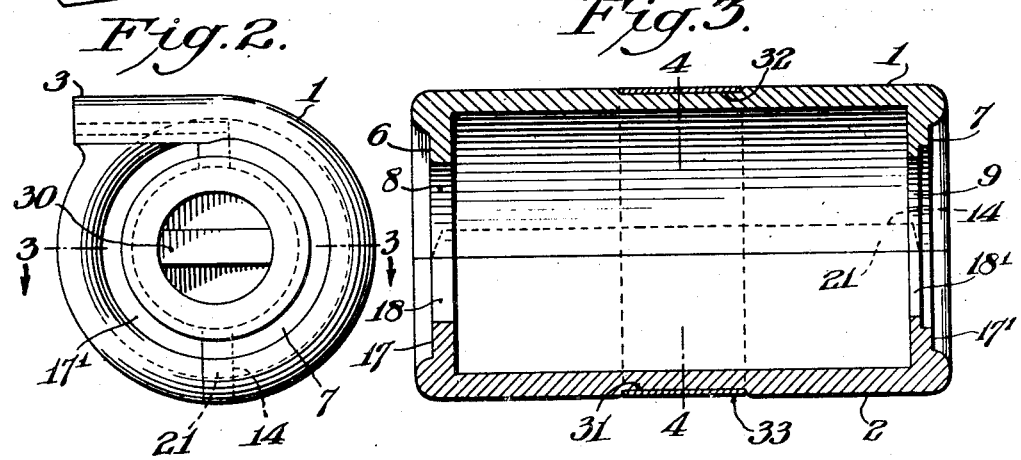
INVENTOR.
OSWALD A. NEBEL
BY
Lynn Barratt Morris
ATTORNEY July 26, 1949.  O. A. NEBEL  2,476,996
CASING FOR SPOOLS OF PHOTOGRAHIC FILM AND
ASSEMBLED FILM CARTRIDGES
Filed Dec. 21, 1946  2 Sheets-Sheet 2
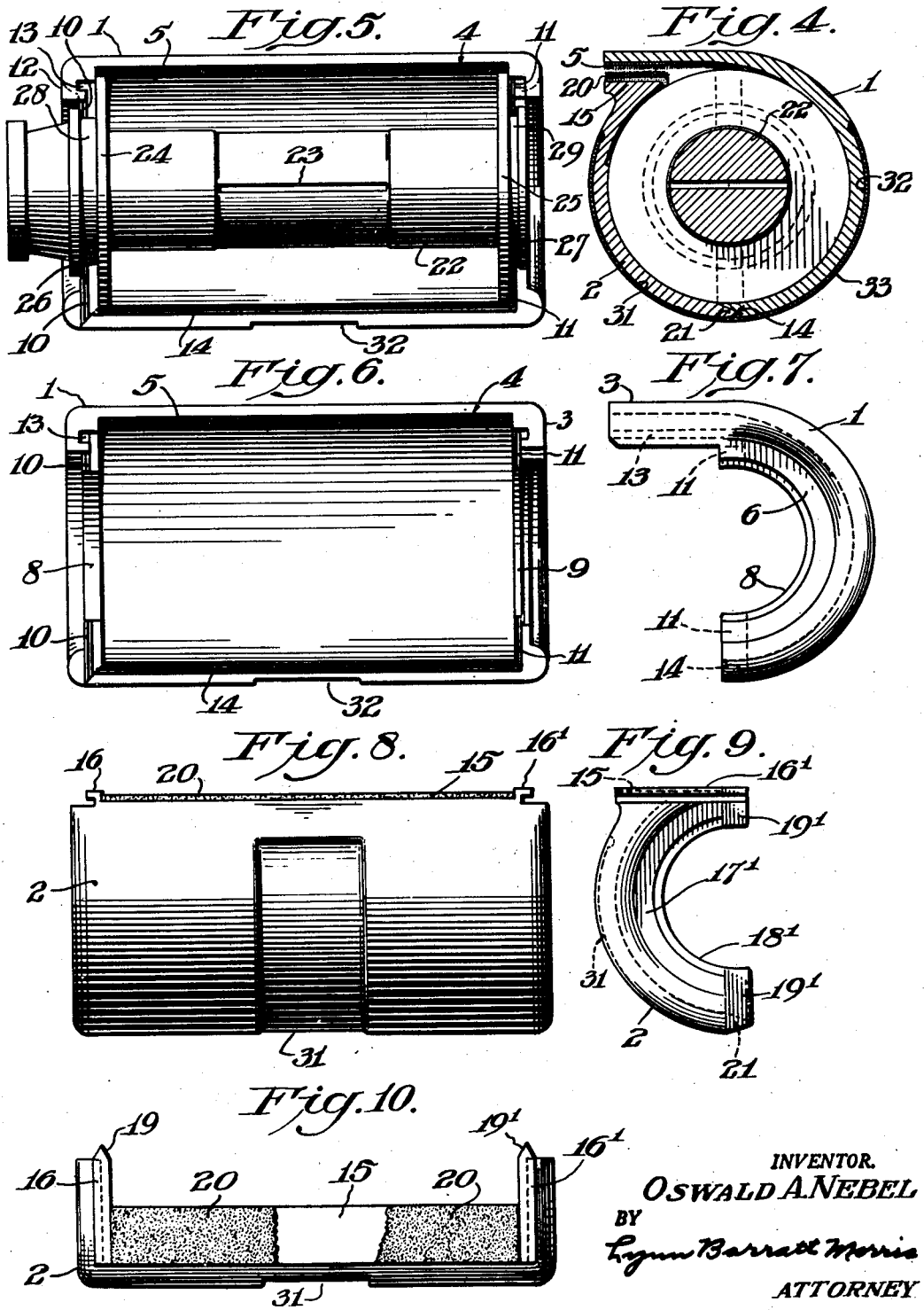
INVENTOR.
OSWALD A. NEBEL
BY
Lynn Barratt Morris
ATTORNEY Patented July 26, 1949

2,476,996

UNITED STATES PATENT OFFICE 2,476,996

CASING FOR SPOOLS OF PHOTOGRAPHIC FILM AND ASSEMBLED FILM CARTRIDGES

Oswald A. Nebel, Fords, N. J., assignor to E. I. du Pont de Nemours & Company, Wilmington, Del., a corporation of Delaware Application December 21, 1946, Serial No. 717,645

4 Claims. (Cl. 242—71)

This invention relates to photographic articles and, more particularly, to a novel casing for a spool of photographic film and to an assembled film cartridge.

An object of this invention is to provide a durable and inexpensive film cartridge. Another object is to provide a simple film spool casing which can be readily made from die-cast or molded materials. Another object is to provide a light-tight casing for a spool of film which can be readily assembled and disassembled. A further object is to provide an improved film cartridge which will remain in tight assembled condition during use. Still other objects will be apparent from the following description of the invention.

The novel casing for a spool of photographic film and the assembled cartridge will now be described with reference to the accompanying drawing which forms a part of this specification. The same numbers refer to the same parts throughout the several views.

Fig. 1 is a perspective view of the various parts of the film cartridge in disassembled relation.

Fig. 2 is an end elevation of the cartridge;

Fig. 3 is a sectional view taken along the lines 3—3 of Fig. 2;

Fig. 4 is a sectional view taken along the lines 4—4 of Fig. 3;

Fig. 5 is an inner elevation of one-half of the film spool casing with the interfitting spool in elevation;

Fig. 6 is an inner elevation of one-half of the casing;

Fig. 7 is an end elevation of one-half of the casing;

Fig. 8 is an outer side elevation of the other half of the casing;

Fig. 9 is an end elevation of the other half of the casing; and

Fig. 10 is a plan view of the other half of the casing.

The casing consists of two interfitting semicylindrical shaped body members 1 and 2, the first of which has an outer tangential lip portion 3 which has an inner, shallow, recessed portion 4 throughout most of its length which is provided with a piece of pile-felt 5. The body 1 is provided with end walls 6 and 7. The semi-circular ends have openings 8 and 9 which are adapted to serve as bearing portions for the hub of a film spool. The walls of said opening are provided with V-shaped grooves 10 and 11 along their diameter. The end walls extend along the tangential lip with small depending portions 12 and 12' which have straight grooves 13 and 13' on their inner sides. The lower edge of the body member 1 has a V-shaped groove 14.

The body member 2 is provided with a reverse tangential lower lip 15 and lateral end flanges 16 and 16' which slide into the grooves 13 and 13'. Flanges 16 and 16' co-operate with the lower walls of grooves 13 and 13' so that end walls 17 and 17' are flush with end walls 6 and 7. The end walls of body member 2 having openings 18 and 18' which likewise form bearing portions for the hub of a film spool. The diametric edges of the end walls have V-shaped points 19 and 19' which interfit with the V-shaped grooves in the end walls of body member 1. A piece of pile-felt 20 is placed on the reverse tangential lip and co-operates with felt 5 to form a light-seal for a piece of film which is withdrawn between the lips. The bottom edge of body member 2 has a V-shaped point 21 which interfits with V-shaped groove 14.

A film spool 22 is provided with a slot 23 which is adapted to receive the end of a film element (not shown) and end flanges 24 and 25 which are spaced so that they bear snugly against the inner walls of the body members 1 and 2 of the casing. Spaced a short distance from the two angular flanges are two flanges 26 and 27 of lesser diameter. Grooves 28 and 29 between the flanges interfit with the end walls of the body members thus producing effective light-seals along the hub member. The end of the hub may be provided with a key 30 for engagement with the camera.

Shallow, recessed grooves 31 and 32 are provided in the outer surface of each body member for more than one-half of their peripheral surface. A thin spring clip 33 of cylindrical shape fits into each of grooves 31 and 32 and holds the body members and film spool 22 in tightly assembled relationship. Various other methods of holding the parts in assembled relationship can be used.

Various types of slots or other constructions can be used in the hub members to releasably or fastly attach or join the film element to the hub. They may be provided with hook members which engage with a hole in the end of the film, if desired. A very practical hub and slot construction which is provided with a hook that permanently secures the end of the film thereto is disclosed in assignee's Schmidt application Serial Number 717,641, filed on even date herewith.

The casing body members 1 and 2 and the hub and flanges of the spool may be composed of various materials, e. g., metal, wood, plastic, etc. They may be advantageously made of plastic materials by a molding operation. Suitable materials include synthetic resins, superpolymers, and cellulose derivatives, e. g., cellulose acetate, ethyl cellulose, cellulose propionate, cellulose acetopropionate, cellulose acetobutyrate, methyl cellulose, benzyl cellulose; nylons, polystyrene, alkyd resins, cresol-formaldehyde resins, etc.

The plastic compositions can, of course, be modified by the incorporation of various plasticizers, e. g., camphor, aryl phosphates, alkyl phthalates, glycerol, castor oil, etc.; pigments, e. g., lithopone, graphite, carbon black, titanium oxide, phthalocyanine dyes, etc.; fillers, e. g., wood flour, diatomaceous earth, etc.

When metals are used die castings, as well as powdered metal molding operations, may be resorted to. Among useful metals are brass and aluminum.

The spools and interfitting casing should be photographically inert so that the film elements spooled thereon will not be deleteriously affected. The spools and interfitting casing can be covered with an inert varnish or lacquer to insure against possible deleterious ingredients in the body thereof.

While the preferred construction of the novel film cartridge and casing is shown in the accompanying drawing, the invention is not limited to the particular constructions shown. Thus, the two members need not have the particular types of interlocking tongue and grooves shown. The tongues and grooves may be reversed on the body members, if desired.

Various types of resilient materials may be used instead of the pile-felt, e. g., sponge rubber, cellulose sponge, elastomers, silicones, etc.

In place of the spring clip for holding the casing and assembled cartridge in light-tight or assembled relation, there may be provided other means. Among such means are molded plastic clips, wire clips, and adhesive tapes of the pressure sealing type. Paper labels may be pasted on the two parts.

The novel film cartridge can be readily assembled by winding a film element onto spool 22. A short leader strip or length of film is unwound from the spool and the latter is slipped into casing body member 1 pressing the leader strip or length of film into contact with the felt of upper lip 3. Casing body member 2 is then slipped into interfitting relationship with member 1 and the short length of film or leader allowed to protrude through the opening between the felts on the tangential lips of the casing body members 1 and 2. The spring clip is then forced or snapped into the grooves.

The film casing and cartridge of this invention have the advantage that they are simple and easily assembled. They are highly effective and do not allow light to leak in and expose the film elements. The parts, moreover, do not tend to separate or become loose with ordinary usage. There are no end caps to spring off upon dropping which is a disadvantage of prior constructions.

As many widely different embodiments of this invention can be made without departing from the spirit and scope thereof, it is to be understood that the invention is not to be limited except as defined by the claims.

What is claimed is:

1. A casing for a photographic film cartridge comprising two semicylindrical body members which are provided with end walls having semicircular openings adapted to receive the hub of a film spool, the bottom and side edges of said members having interfitting tongues and grooves, one of said body members having a tangentially disposed lip and the other having a reverse tangentially disposed lip between which is a narrow slot for the passage of a film element, the end walls of said lips having interfitting tongues and grooves, and means for holding said body members in assembled relation.

2. A casing for a photographic film cartridge comprising two semicylindrical body members which are provided with end walls having semicircular openings adapted to receive the hub of a film spool, one of said body members having a tangentially disposed lip with end walls containing a V-shaped groove and having V-shaped grooves in the diametric edges of the end walls and a V-shaped groove in its bottom edge, the other member having a reverse tangentially disposed lip which co-operates with the other lip to form a narrow slot for the passage of a film element, the end walls of said lip having a flange which interlocks with a groove on the end of said first lip to form a light lock, the diametric edges of the end walls and the bottom edge of said other body member being V-shaped to fit in the grooves of the first member and form a light seal, the lips being lined with a resilient material and a spring clip for holding the body in assembled relation.

3. A film cartridge comprising an interfitting casing consisting of two semicylindrical body members which are provided with end walls having semicircular openings adapted to receive the hub of a film spool, the bottom and side edges of said members having interfitting tongues and grooves, one of said body members having a tangentially disposed lip and the other having a reverse tangentially disposed lip between which is a narrow slot for the passage of a film element, the end walls of said lips having interfitting tongues and grooves, and means for holding said body members in assembled relation, a film spool in said casing provided with flanges which abut with the inner end walls of the casing and outer flanges spaced therefrom which abut with the outer end walls of the casing to form a light lock at the openings in said end walls.

4. A film cartridge comprising an interfitting casing consisting of two semicylindrical body members which are provided with end walls having semicircular openings adapted to receive the hub of a film spool, one of said body members having a tangentially disposed lip with end walls containing a V-shaped groove and having V-shaped grooves in the diametric edges of the end walls and a groove in its bottom edge, the other member having a reverse tangentially disposed lip which co-operates with the other lip to form a narrow slot for the passage of a film element, the end walls of said lip having a flange which interlocks with a groove on the end of said first lip to form a light lock, the diametric edges of the end walls and the bottom edge of said other body member being V-shaped to fit in the grooves of the first member and form a light seal, the lips being lined with a resilient material, a spring clip for holding the body in assembled relation, a film spool in said casing provided with flanges which abut with the inner end walls of the casing and outer flanges spaced therefrom which abut with the outer end walls of the casing to form a light lock at the openings in said end walls.

OSWALD A. NEBEL.

REFERENCES CITED

The following references are of record in the file of this patent:

UNITED STATES PATENTS

| Number | Name | Date |
|---|---|---|
| 1,987,247 | Schnitzler | Jan. 8, 1935 |
| 2,153,573 | Kinloch | Apr. 11, 1939 |

FOREIGN PATENTS

| Number | Country | Date |
|---|---|---|
| 310,173 | Great Britain | Apr. 25, 1929 |
| 360,050 | Great Britain | Nov. 5, 1931 |
| 570,330 | Germany | Feb. 15, 1933 |